United States Patent
Fan

(10) Patent No.: US 7,399,455 B2
(45) Date of Patent: Jul. 15, 2008

(54) EXHAUST FILTER SYSTEM FOR NON-ROAD ENGINE

(76) Inventor: Guo Xiang Fan, 4951 Commerce Dr., Baldwin Park, CA (US) 91706

( * ) Notice: Subject to any disclaimer, the term of this patent is extended or adjusted under 35 U.S.C. 154(b) by 659 days.

(21) Appl. No.: 10/976,713

(22) Filed: Oct. 28, 2004

(65) Prior Publication Data

US 2005/0058585 A1  Mar. 17, 2005

Related U.S. Application Data

(62) Division of application No. 10/392,524, filed on Mar. 19, 2003, now Pat. No. 7,279,141.

(51) Int. Cl.
*B01D 47/00* (2006.01)
*F01N 3/00* (2006.01)
(52) U.S. Cl. .............................. 423/210; 60/274; 60/299
(58) Field of Classification Search .................. 422/171, 422/177, 179, 180, 221, 222; 60/274; 423/210
See application file for complete search history.

(56) References Cited

U.S. PATENT DOCUMENTS 5,651,906 A * 7/1997 Whittenberger et al. ..... 219/552
5,820,835 A * 10/1998 Sheller et al. ............... 422/180
5,849,251 A * 12/1998 Timko ........................ 422/177
5,852,274 A * 12/1998 Watanabe et al. ......... 219/117.1

* cited by examiner

*Primary Examiner*—Glenn Caldarola
*Assistant Examiner*—Tom Duong
(74) *Attorney, Agent, or Firm*—Raymond Y. Chan; David and Raymond Patent Firm

(57) ABSTRACT

An exhaust filter system, adapted for removing substances entrained in an exhaust gas from a nonroad engine, includes a casing having a filter cavity for communicating with an exhaust outlet of the generator and a filter core which includes a plurality of filtering loops, each having a plurality of air pores, coaxially received in the filter cavity, a plurality of filtering spacers each having a plurality of air meshes and positioned between each two filtering loops to define a plurality of air passages therebetween, and a catalyzing element for chemically reacting with the substances of the exhaust gas. Therefore, when the exhaust gas passes through the air passages of the filter core, the exhaust gas is evenly diffused to the filter cavity through the air pores and the air meshes so as to enhance a chemical reaction of the exhaust gas with the catalyzing element.

15 Claims, 4 Drawing Sheets

EXHAUST FILTER SYSTEM FOR NON-ROAD ENGINE

CROSS REFERENCE TO RELATED APPLICATION

This is a divisional application that claims the benefit of priority under 35U.S.C.§119 to a non-provisional application, application No. 10/392,524, filed Mar. 19, 2003 now U.S. Pat. No. 7,279,141.

BACKGROUND OF THE PRESENT INVENTION

1. Field of Invention

The present invention relates to a nonroad engine, and more particularly to an exhaust filter system for a diesel/gasoline nonroad engine for such as a generator, which substantially removes harmful substances of exhaust gases from the generator.

2. Description of Related Arts

Conventional generator generally includes a nonroad internal combustion engine comprising a crankshaft, and a fuel reservoir for supplying fuel to the internal combustion engine in such a manner that when the fuel is ignited in the internal combustion engine to complete a combustion process, the crankshaft is driven to rotate for producing mechanical power. Therefore, by incorporating an induction rotor with the internal combustion engine, the mechanical rotational force produced by the internal combustion engine is transformed into a motional electromotive force through a magnetic force provided by the induction rotor so as to convert into an electrical energy.

Generally speaking, there are two types of nonroad engine, which are diesel engine and gasoline engine, commonly used. Since the compression ratio of the diesel engine is higher than that of the gasoline engine, the diesel engine is usually more efficient than the gasoline engine. However, both diesel and gasoline engines have a common drawback.

Due to the inefficiency of fuel ignition in the nonroad engine, the resulting incomplete combustion of the fuel, especially for the diesel engine, leads to carbon monoxide (CO), nitrogen oxides (NOx)and unburned hydrocarbons (HC) in the exhaust gas that contributes to air pollution. Therefore, in order to market the nonroad engines and generators in the United States, the exhaust gas of the nonroad engine must meet the exhaust certification standard (STD) and certification levels (CERT) for hydrocarbon (HC), oxides of nitrogen (NOx), or non-methane hydrocarbon plus oxides of nitrogen (NMHC=NOx), carbon monoxide (CO, and particular matter (PM) in grams per kilowatt-hour (g/kW–hr), and the opacity-of-smoke certification standards and certification levels in percent (%) during acceleration (Accel), lugging (Lug), and the peak value from either mode (Peak) for this engine family (Title 13, California Code of Regulations, (13 CCR) Section 2423) of the United States Environmental Protection Agency and the state agency such as California Air Resources Board.

SUMMARY OF THE PRESENT INVENTION

A main object of the present invention is to provide an exhaust filter system for a nonroad engine which can substantially remove harmful substances of exhaust gas from the nonroad engine Another object of the present invention is to provide an exhaust filter system for a nonroad engine (19.5 KW of less) for generator which exhaust gas meets the exhaust certification standard (STD) and certification levels (CERT) for hydrocarbon (HC), oxides of nitrogen (NOx), or non-methane hydrocarbon plus oxides of nitrogen (NMHC=NOx), carbon monoxide (CO, and particular matter (PM) in grams per kilowatt-hour (g/kW–hr), and the opacity-of-smoke certification standards and certification levels in percent (%) during acceleration (Accel), lugging (Lug), and the peak value from either mode (Peak) for this engine family (Title 13, California Code of Regulations, (13 CCR) Section 2423) of the United States Environmental Protection Agency.

Another object of the present invention is to provide an exhaust filter system which is specifically designed for a nonroad engine having no more than 25 horsepower. In other words, the exhaust filter system is adapted to employ with a portable generator or a lawn mower to minimize air pollution.

Another object of the present invention is to provide an exhaust filter system for a generator, wherein the exhaust filter system can be incorporated with a diesel engine or a gasoline engine of the generator to effectively filter out the harmful substances of the exhaust gas from the generator.

Another object of the present invention is to provide an exhaust filter system for a generator, wherein a filter core comprises a flat filtering net and a corrugated filtering layer overlapped thereto to form a plurality of air passages between the flat and corrugated filtering layers in such a manner that when the exhaust gas passes through the air passages, the exhaust gas is evenly diffused to the filter core to chemically react with a catalyzing element. Therefore, the harmful substances in the exhaust gas can be substantially filtered out.

Another object of the present invention is to provide an exhaust filter system for a generator, wherein the exhaust gas is evenly distributed though the filter core for maximizing a contacting area between the exhaust gas and the filter core so as to enhance the catalyzing process of the exhaust gas.

Another object of the present invention is to provide an exhaust filter system for a generator, wherein the manufacturing process of the filter core is simply by coiling a flat filtering layer with a corrugated filtering layer, so as to minimize the manufacturing cost of the exhaust filter system of the present invention.

Another object of the present invention is to provide an exhaust filter system for a generator, which successfully provides an economic and efficient solution for filtering the harmful substances of exhaust gas from the generator, so as to minimize air pollution contributed by the generator.

Accordingly, in order to accomplish the above objects, the present invention provides an exhaust filter system for removing substances entrained in an exhaust gas from a nonroad engine, having a horsepower not more than 25 hp, having an exhaust outlet to discharge the exhaust gas, comprising:

a filter casing having an intake opening for communicating with the exhaust outlet, a discharging opening, and a filter cavity communicating the intake opening with the discharging opening for guiding the exhaust gas to flow from the intake opening to the discharging opening through the filter cavity; and a filter core, which is disposed in the filter cavity, comprising:

a plurality of tubular filtering loops coaxially received in the filter cavity, wherein a plurality of air pores are formed on the filtering loops for allowing the exhaust gas passing therethrough;

a plurality of tubular filtering spacers each positioned between each two filtering loops to define a plurality of axial air passages between the filtering spacers and the filtering loops so as to communicate with the air pores thereof, wherein a plurality of air meshes are formed on the filtering spacers to communicate with the air passages; and a catalyzing element provided on the filtering loops and the filtering spacers for chemically reacting with the substances of the exhaust gas, thereby, when the exhaust gas passes through the air passages of the filter core, the exhaust gas is evenly diffused to the filter cavity through the air pores and the air meshes so as to enhance a chemical reaction of the exhaust gas with the catalyzing element.

These and other objectives, features, and advantages of the present invention will become apparent from the following detailed description, the accompanying drawings, and the appended claims.

DETAILED DESCRIPTION OF THE PREFERRED EMBODIMENT

Figure 1:
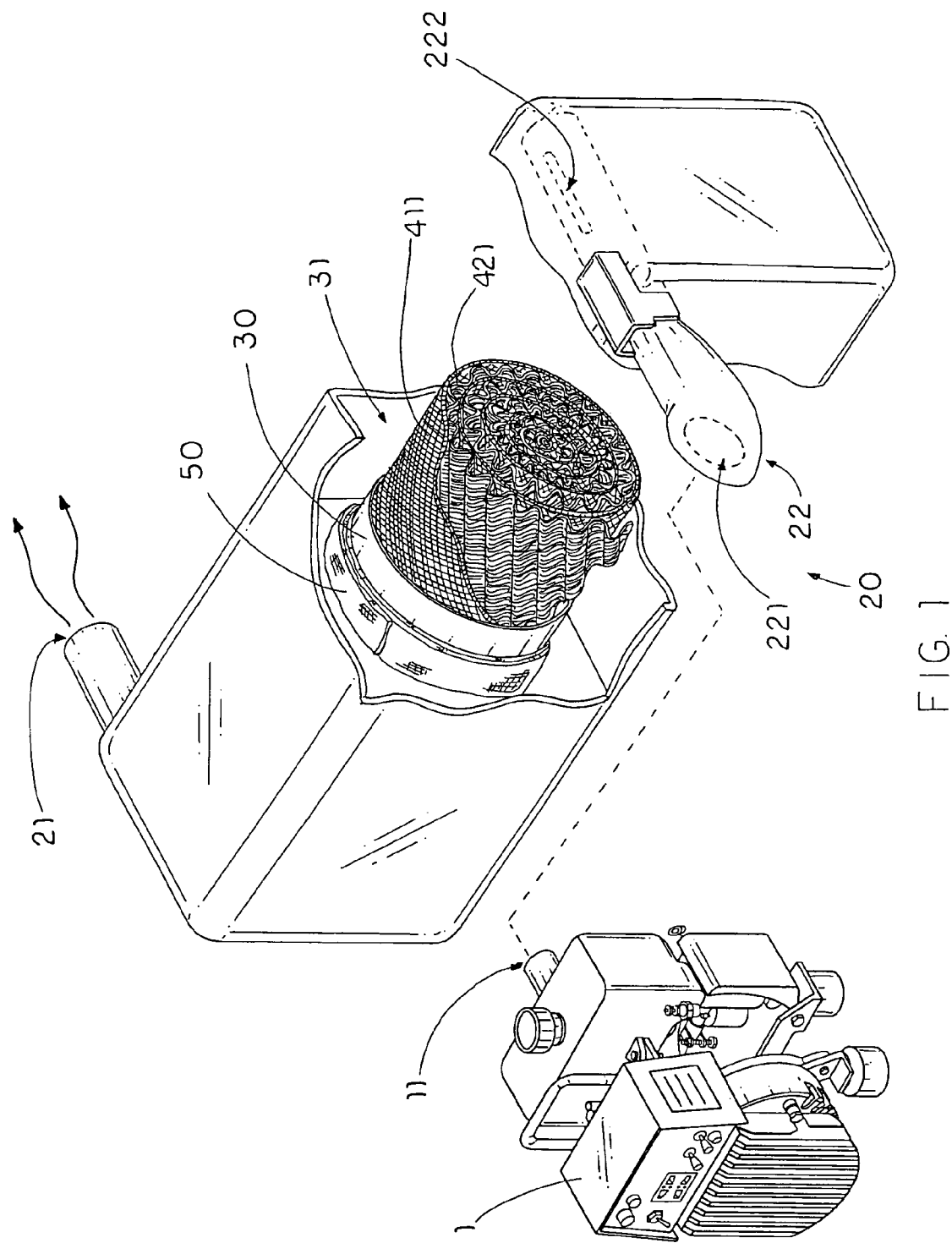
FIG. 1 is a perspective view of an exhaust filter system for a generator according to a preferred embodiment of the present invention.

Referring to FIG. 1 of the drawings, the present invention provides an exhaust filter system 2 for nonroad engine. According to a preferred embodiment of the present invention, the nonroad engine is embodied to constructed in a generator 1 (19.5 KW or less), wherein the exhaust filter system 2 is adapted for removing substances entrained in an exhaust gas from the generator 1.

Accordingly, the generator 1 can be a nonroad diesel engine type or a nonroad gasoline engine type, having a horsepower not more than 25 hp, such as a portable generator or a lawn mower. The generator 1 has an exhaust outlet 11 to discharge the exhaust gas.

The exhaust filter system 2 comprises an outer shelter 20 having an air outlet 21 and an air inlet 22 adapted for communicatively connecting with the exhaust outlet 11 of the generator 1, and a filter casing 30, which is supported in the outer shelter 20, having a filter cavity 31 communicating the air inlet 22 with the air outlet 21 for guiding the exhaust gas to flow from the air inlet 22 to the air outlet 21 through the filter cavity 31.

Figure 2:
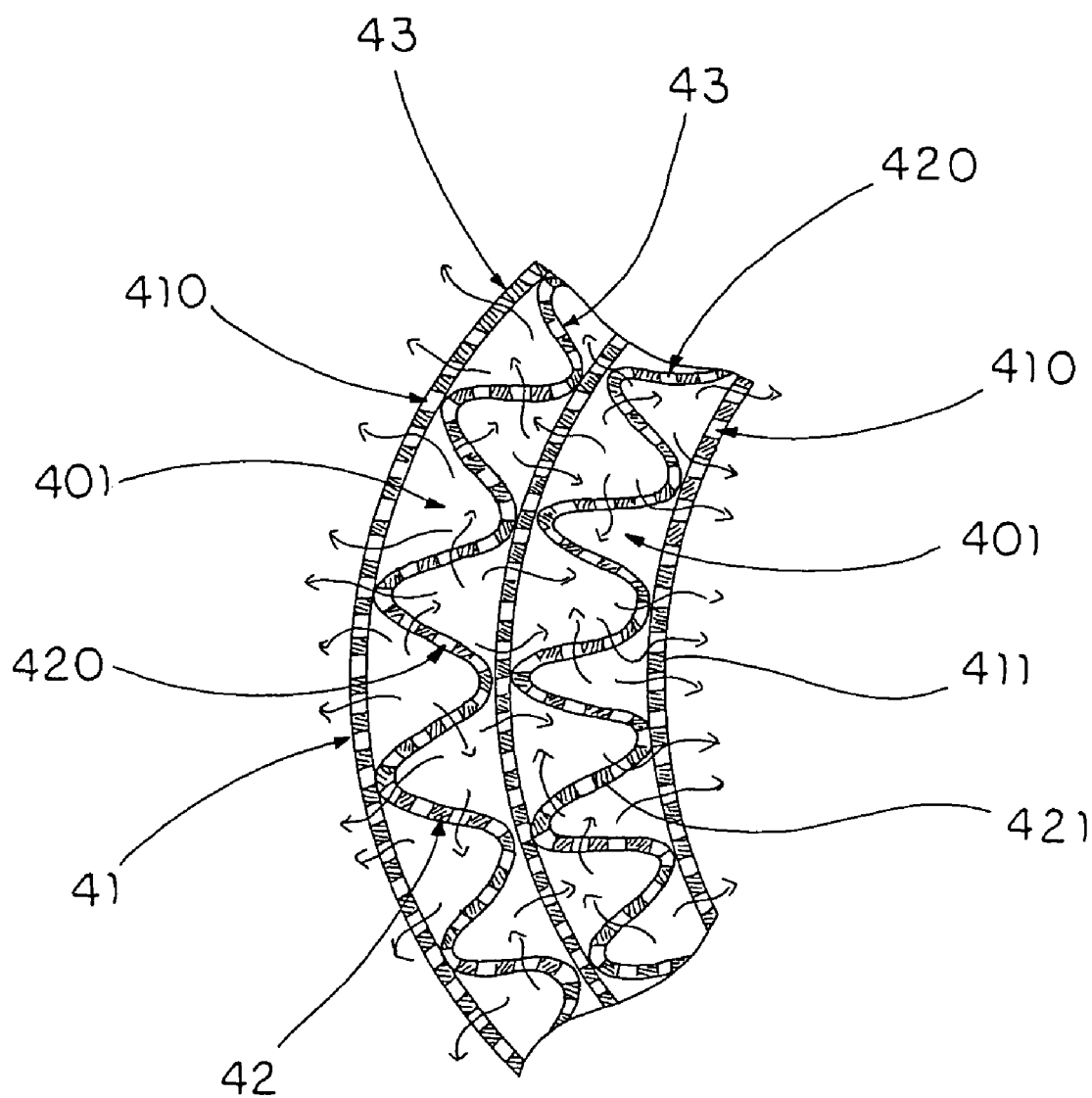
FIG. 2 is a partially front sectional view of the exhaust filter system according to the above preferred embodiment of the present invention.

As shown in FIG. 2, the exhaust filter system further comprises a filter core 40, which is disposed in the filter cavity 31, comprising a plurality of tubular filtering loops 41 coaxially received in the filter cavity 31, wherein a plurality of air pores 410 are formed on the filtering loops 41 for allowing the exhaust gas passing therethrough, a plurality of tubular filtering spacers 42 each positioned between each two filtering loops 41 to define a plurality of axial air passages 401 between the filtering spacers 42 and the filtering loops 41 so as to communicate with the air pores 410 thereof, wherein a plurality of air meshes 420 are formed on the filtering spacers 42 to communicate with the air passages 401, and a catalyzing element 43 provided on the filtering loops 41 and the filtering spacers 42 for chemically reacting with the substances of the exhaust gas. Thereby, when the exhaust gas passes through the air passages 401 of the filter core 40, the exhaust gas is evenly diffused to the filter cavity 31 through the air pores 410 and the air meshes 420 that increases the contact surface area and thus enhances the chemical reaction of the exhaust gas with the catalyzing element 43.

Figure 3:
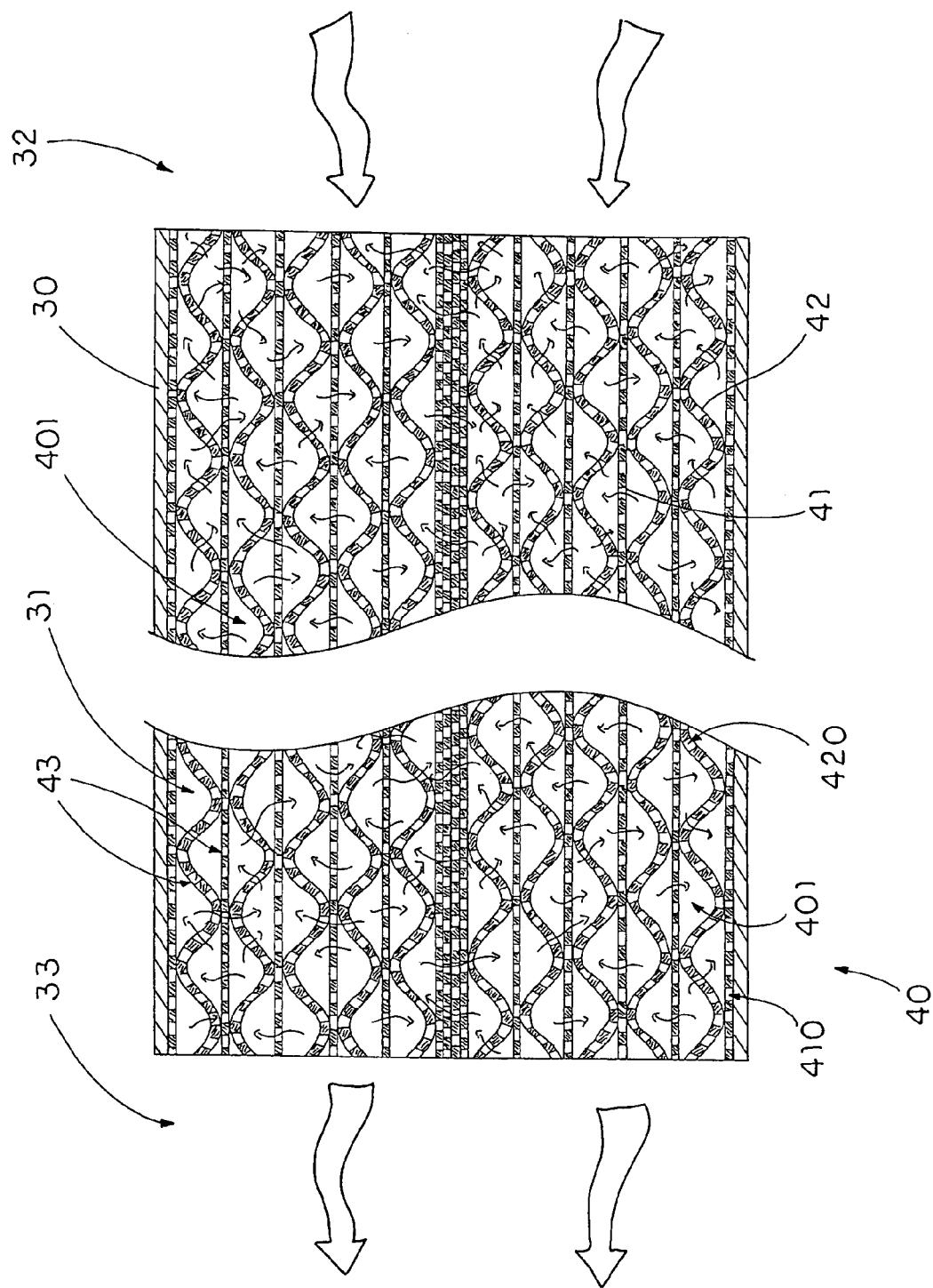
FIG. 3 is a sectional view of the filter core of the exhaust filter system according to the above preferred embodiment of the present invention.

According to the preferred embodiment, the outer shelter 20 is made of heat resistance material, such as steel, rear metals like platinum, palladium and rhodium, transitional metals and lanthanon, wherein the air inlet 22 is embodied as an air conduit having an in-flowing opening 221 for connecting with the exhaust outlet 11 of the generator 1 and an elongated out-flowing opening 222 aligned with the filter cavity 31 of the filter casing 30 for guiding the exhaust gas from the generator 1 to the filter cavity 31 through the elongated out-flowing opening 222. Since the exhaust gas is guided to spread out from the elongated out-flowing opening 222 of the air inlet 22, the exhaust gas can be evenly distributed to the filter core 40 within the filter cavity 31 of the filter casing 30, as shown in FIG. 3.

The filter casing 30, having a hollow shape, has an intake opening 32 for communicating with the exhaust outlet 11 and a discharging opening 33 wherein the filter cavity 31 is communicating the intake opening 32 with the discharging opening 33 for guiding the exhaust gas to flow from the intake opening 32 to the discharging opening 33 through the filter cavity 31. Accordingly, the exhaust gas is guided to flow from the generator 1 to the intake opening 32 through the elongated out-flowing opening 222 of the air inlet 22 of the outer shelter 20 while the exhaust gas is guided to discharged from the air outlet 21 of the outer shelter 20 through the discharging opening 33 of the filter casing 30.

As shown in FIG. 2, the filtering loops 41 of the filter core 40 are integrally extended edge-to-edge in a spiral manner wherein the filtering loops 41 are formed by coiling up a flat filtering layer 411. The flat filtering layer 411 is constructed as a sheet liked wire net having a heat resistance ability wherein the air pores 410 are evenly formed on the flat filtering layer 4111 for allowing the exhaust gas passing therethrough.

The filtering spacers 42 of the filter core 40 are integrally extended edge-to-edge in a spiral manner wherein the filtering spacers 42 are formed by coiling up a corrugated filtering layer 421. The corrugated filtering layer 421 is constructed as a wire net having a wavy cross sectional and a heat resistance ability, wherein the air meshes 420 are evenly formed on the corrugated filtering layer 421 for allowing the exhaust gas passing therethrough.

Figure 4:
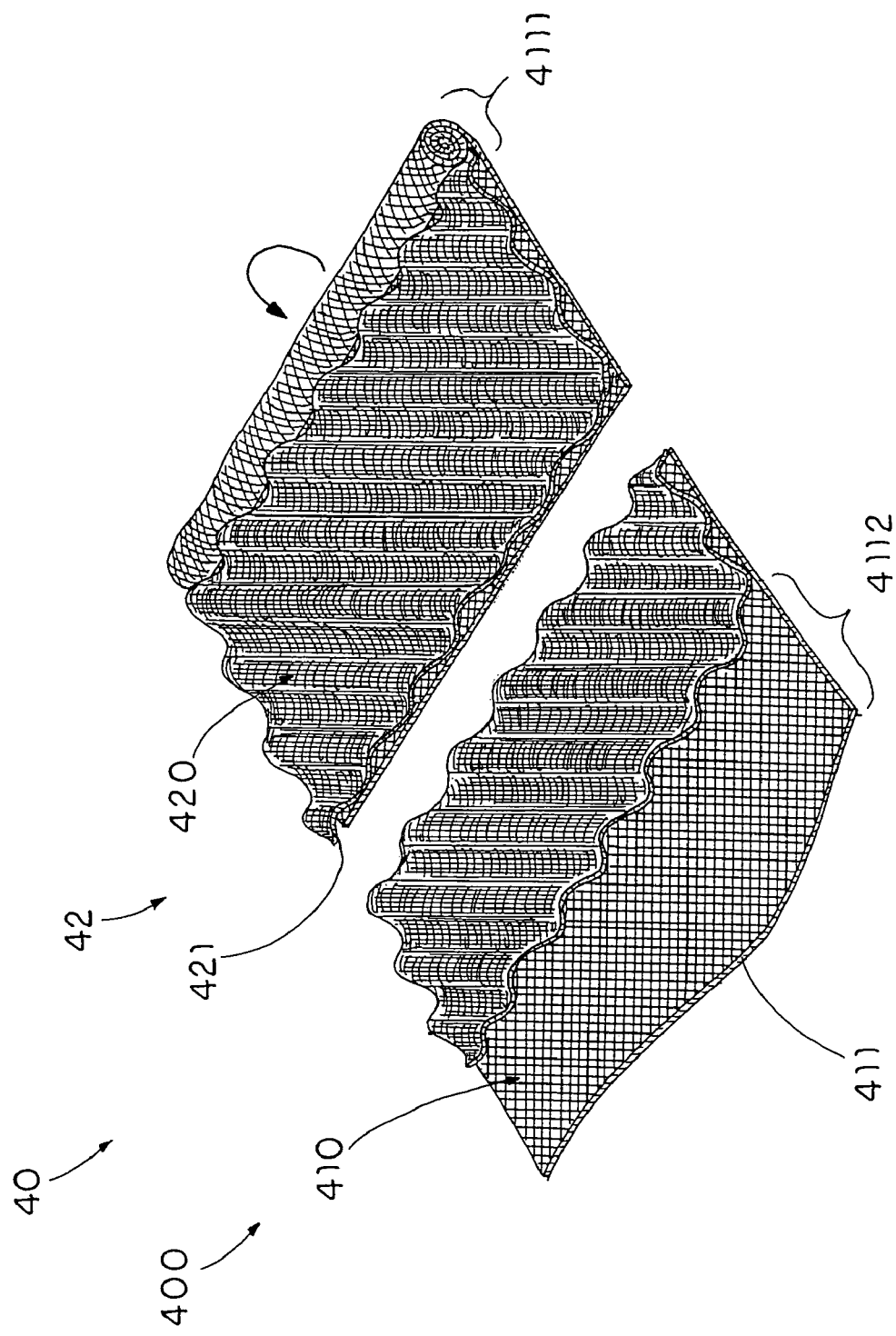
FIG. 4 is a perspective view of a filter core of the exhaust filter system according to the above preferred embodiment of the present invention, illustrating the corrugated filtering layer being overlapped on the flat filtering layer to form the air filtering net.

In order to form the filter core 40, the corrugated filtering layer 421 is overlapped on the flat filtering layer 411 to form an air filtering net 400 wherein the air filtering net 400 is coiled in a spiral manner to form the filtering loops 41 and the filtering spacers 42. When the air filtering net 400 is coiled in a spiral manner, the corrugated filtering layer 421 functions as a space guider to create a coiled space of the flat filtering layer 411 in a coiled manner, as shown in FIG. 4.

Accordingly, the corrugated filtering layer 421 should have a width shorter than a width of the flat filtering layer 411, wherein when the corrugated filtering layer 421 is overlapped on the flat filtering layer 411, a first longitudinal side edge portion 4111 of the flat filtering layer 411 is defined to coil as a center of the filter core 40 and a second longitudinal side edge portion 4112 of the flat filtering layer 411 is defined to coil as an outer circumferential loop of the filter core 40. In other words, the second longitudinal side edge portion 413 of the flat filtering layer 411 has a width at least larger than an inner circumference of the filter cavity 31 of the filter casing 30.

The air filtering net 400 in a coiled manner is coaxially disposed in the filter cavity 31 of the filter casing 30 wherein each of the air passages 401 is axially extended from the intake opening 32 of the filter casing 30 to the discharging opening 33 thereof through the filter cavity 31 in a spiral manner.

An active layer of r-AL2O3 is coated on the flat filtering layer 411 of filtering loops 41 and the corrugated filtering layer 421 of the filtering spacers 42 as the catalyzing element 43 according to the preferred embodiment, wherein the catalyzing element 43 is able to remove the harmful substances, such as carbon monoxide, hydrocarbons and nitrogen oxides, from the exhaust gas when the exhaust gas passes through the air pores 410 of the flat filtering layer 411 and the air meshes 420 of the corrugated filtering layer 421.

When the exhaust gas discharges from the generator 1 to the filter core 40 through the air inlet 22, the exhaust gas is guided to flow along the air passages 401 and to diffuse to the filter cavity 31 through the air pores 410 and the air meshes 420. Since the flat filtering layer 411 and the corrugated filtering layer 421 create lots of contacting areas between the catalyzing element 43 and the exhaust gas, the catalyzing element 43 can substantially react with the exhaust gas to remove the substances of the exhaust gas.

As shown in FIG. 1, the exhaust filter system 2 further comprises a heat resistance element 50 provided between the outer shelter 20 and the filter casings 30 for resisting heat distributing from the filter casing 30 to the outer shelter 20. Accordingly, the heat resistance element 50 is a heat-resisting layer preferably made of asbestos encirclingly covered on the filter casing 30 so as to prevent the heat conducting from the filter casing 30 to the outer shelter 20. It is worth to mention that since the temperature of the exhaust gas from the generator 1 is relatively high, the exhaust gas will heat up the filter casing 30 when the exhaust gas passes through the filter core 40. Therefore, in order to prevent the heat conduction of the outer shelter 20 for safety purpose, the heat resistance element 50 should be enclosed within the outer shelter 20 to resist the heat transferring from the filter core 40.

In addition, the heat resistance element 50 can be made of noise reduction material to minimize the noise of the exhaust gas passing through the filter core 40, so as to reduce the noise pollution as well as the air pollution.

Accordingly, the filter core 40 of the present invention provides high surface-to-volume-ratio reaction surface area, low burning point, short burning time, anti-vibration, good inverting effect, small exhausting pressure and no wastage of power.

It is worth to mention that the nonroad compression-ignition engine incorporated with the innovative exhaust filter system of the present invention is the first nonroad engine to utilize the exhaust filter system as described in the present invention that passes the test and obtains the approval for performance by the United States Environmental Protection Agency, pursuant to Section 213 of the Clean Air Act (42 U.S.C. section 7547) and 40 CFR 89. In addition, the nonroad engine incorporated with the exhaust filter system of the present invention also obtains certification from the California Air Resources Board, pursuant to the authority vested in the Air Resources Board by Sections 43013, 43018, 43101, 43102, 43104 and 43105 of the Health and Safety Code and pursuant to the authority vested in the undersigned by Sections 39515 and 39516 of the Health and Safety Code and Executive Order G-02-003.

According to the CARB test report for an exhaust filter system 2 comprising a filter core 40 having a diameter of 48 mm, a length of 60 cm, 50-60 air pores 410 per square centimeter and 200 air meshes 420 per square centimeter is used to improve the emission of an air-cooled nonroad diesel engines.

The following test result is achieved:

| Rated Power | Emission Standard | | EXHAUST (G/kW-hr) | | | | | OPACITY (%) | | |
|---|---|---|---|---|---|---|---|---|---|---|
| Class | Category | | HC | NOx | NMHC + NOx | CO | PM | ACCEL | LUG | PEAK |
| kW <8 | Tier 1 | STD | N/A | N/A | 10.5 | 8.0 | 1.0 | N/A | N/A | N/A |
|  |  | CERT | — | — | 6.8 | 0.002 | 0.6 | — | — | — |

STD: Standard
CERT: Certification

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A process of removing substances entrained in an exhaust gas from a nonroad engine having an exhaust outlet to discharge said exhaust gas, comprising the steps of: (a) intaking said exhaust gas from said nonroad engine into a filter cavity containing a filter core therein, wherein said filter core has a plurality of air pores distributed; (b) diffusing said exhaust gas to said filter cavity through said pores while passing said exhaust gas through said filter core; (c) removing predetermined substances in said exhaust gas by chemically reacting said exhaust gas with a catalyzing element provided around aid air pores of said filter core to form a filtered exhaust gas; and (d) discharging said filtered exhaust gas from said filter cavity;

wherein the step (b) further comprises the steps of: (b-1) guiding said exhaust gas to flow through said filter core in said filter cavity, wherein said filter core comprises a plurality of tubular filtering loops coaxially received in said filter cavity where said air pores are formed on said filtering loops for allowing said exhaust air passing therethrough, wherein said filter core further comprises a plurality of tubular filtering spacers each positioned between each said two filtering loops to define a plurality of axial air passages between said filtering spacers and said filtering loops so as to communicate with said air pores thereof, wherein a plurality of air meshes are formed on said filtering spacers to communicate with said air passages; and (b-2) evenly diffusing said exhaust gas to said filter cavity through said air pores and said air meshes by passing said exhaust gas through said air passages of said filter core so as to enhance a chemical reaction of said exhaust gas with said catalyzing element.

2. The process, as recited in claim 1, wherein said filtering loops of said filter core are integrally extended edge-to-edge in a spiral manner.

3. The process, as recited in claim 2, wherein each of said air passages is axially extended through said filter cavity in a spiral manner.

4. The process, as recited in claim 1, wherein said filter cavity is filled with said filter core.

5. The process, as recited in claim 1, wherein said catalyzing element is coated around said air pores of said filter core.

6. The process, as recited in claim 1, wherein said catalyzing element is coated on said filtering loops and said filtering spacers for chemically reacting with said exhaust gas while passing through said air pores and said air meshes respectively.

7. The process, as recited in claim 6, further comprising a step (e) of resisting heat distributing from said filter cavity throughout said process.

8. The process, as recited in claim 1, further comprising a step (e) of resisting heat distributing from said filter cavity throughout said process.

9. The process, as recited in claim 1, further comprising a step (e) of resisting heat distributing from said filter cavity throughout said process.

10. The process, as recited in claim 1, wherein each of said air passages is axially extended through said filter cavity in a spiral manner.

11. The process, as recited in claim 1, wherein said filter core is constructed by overlapping a corrugated filtering layer having said air meshes formed thereon on a flat filtering layer having said air pores formed thereon to form an air filtering net and by coiling said air filtering net to form said filtering loops via said flat filtering layer and said filtering spacers via said corrugated filter layer.

12. The process, as recited in claim 11, wherein said catalyzing element is coated on said flat filtering layer and said corrugated filtering layer for chemically reacting with said exhaust gas while passing through said air pores and said air meshes respectively.

13. The process, as recited in clam 12, further comprising a step (e) of resisting heat distributing from said filter cavity.

14. The process, as recited in claim 11, wherein said catalyzing element is coated on said flat filtering layer and said corrugated filtering layer for chemically reacting with said exhaust gas while passing through said air pores and said air meshes respectively.

15. The process, as recited in claim 11, wherein said catalyzing element is coated on said flat filtering layer and said corrugated filtering layer for chemically reacting with said exhaust gas while passing through said air pores and said air meshes respectively.

* * * * *